H. WADSWORTH.
Device for Placing the Working of more than one Engine or Mechanism under the Control of a Single Lever.
No. 213,079. Patented Mar. 11, 1879.
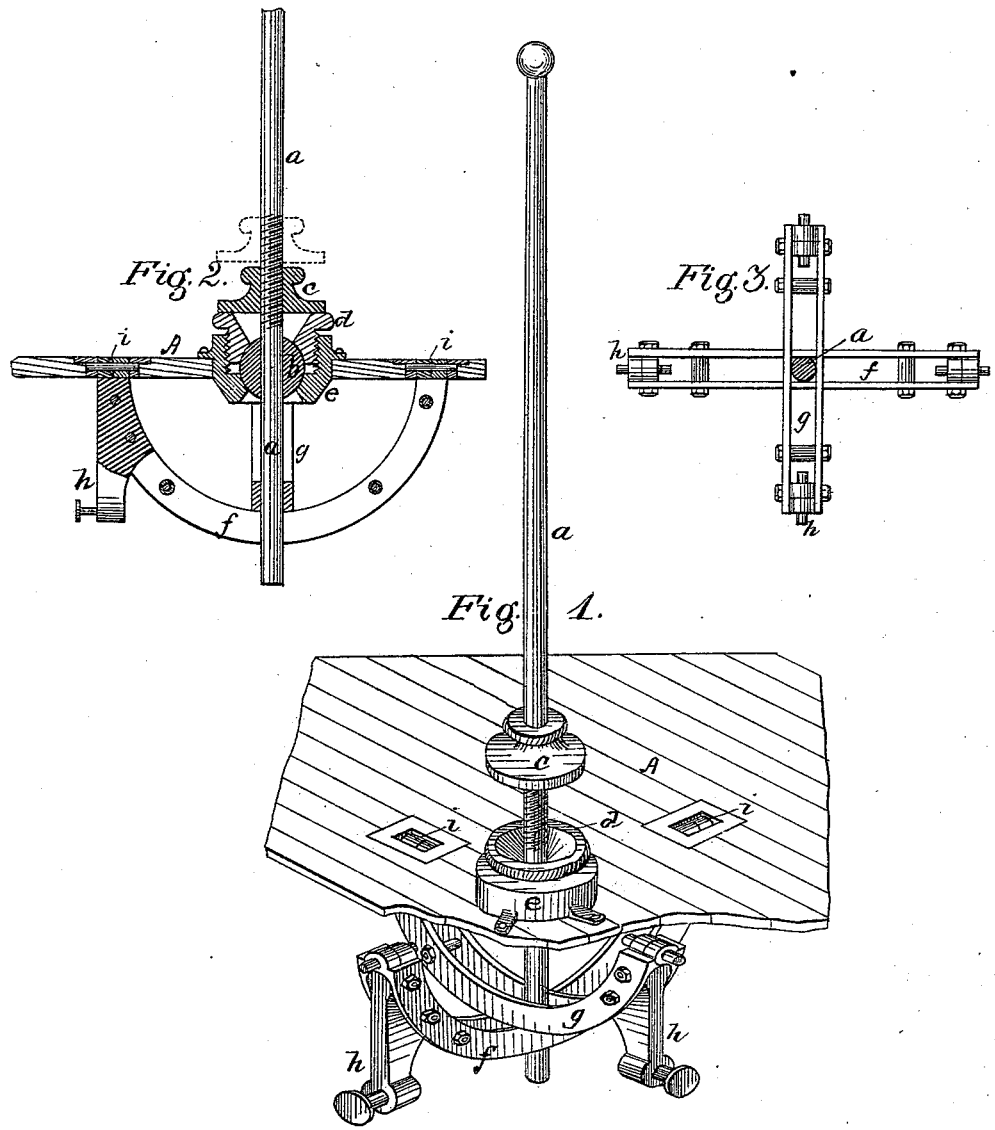

UNITED STATES PATENT OFFICE.

HERBERT WADSWORTH, OF GENESEO, NEW YORK.

IMPROVEMENT IN DEVICES FOR PLACING THE WORKING OF MORE THAN ONE ENGINE OR MECHANISM UNDER THE CONTROL OF A SINGLE LEVER.

Specification forming part of Letters Patent No. 213,079, dated March 11, 1879; application filed February 1, 1879.

*To all whom it may concern:*

Be it known that I, HERBERT WADSWORTH, of Geneseo, Livingston county, New York, have invented certain new and useful improvements in devices for placing the working of more than one engine or mechanism under the control of a single lever or handle—as, for instance, the steering and driving engines of steam-vessels or traction-engines and the like—of which the following is a specification:

It is my object to control through one lever or handle the simultaneous or independent action of engines or mechanisms, so that they may be worked singly, together, or in opposition.

I employ for this purpose a lever moving on a universal joint as a pivot, and connected to the means for actuating either engine in such a manner that, in accordance with the direction of its movement, it may actuate either engine separately or both conjointly, and in any sense or direction desired.

The nature of my invention and the manner in which it may be carried into effect may best be explained by reference to the accompanying drawings, in which I have represented my invention as applied to means for controlling the link-motion and the tiller-engine of a vessel.

Figure 1 is a perspective view of the apparatus in which my invention is essentially comprised, a portion of the floor or deck being broken away to exhibit more clearly the details of construction. Fig. 2 is a vertical section in the plane of one of the arcs hereinafter mentioned. Fig. 3 is a plan of the two arcs.

*a* is a lever, which is hung by a universal joint in the deck or floor A. The joint, in the present case, is a ball-and-socket joint, the ball *b* being fast to the lever and seated in a divided socket, one part, *e*, of which is fixed in the deck, while the other part, *d*, screws down into the lower part, *e*, over the top of the ball. The apertures in the two parts of the socket through which the lever works are made flaring to allow the lever ample range of movement.

I prefer a universal joint of this construction; but I wish it understood that any joints of other make which will allow the requisite movement to the lever can be employed.

Upon the handle part of the lever I prefer to mount a nut, *c*, which engages a screw-thread on the handle, as shown. This nut can be screwed down upon the top of the socket-piece *d*, and when thus screwed down prevents the handle from moving. In this way I can securely lock the apparatus and prevent accidental disturbance of the handle.

The universal-joint lever *a* is used to actuate two arcs, *f g*. Each arc is composed of two parallel curved straps, held together by bolts, as shown, and hung on bolts or hinges *i* in the floor or deck A. The two hinged arcs are placed at right angles to one another, and in the square formed by the crossing of the four straps of which they are composed enters the lower end of the lever *a*, which lower end is preferably cylindrical, to prevent any liability to stick or bind when the handle is moved. The movement of the lever in one plane will actuate, for instance, the arc *f* only. Its movement in the opposite plane will actuate only the arc *g*, while its movement diagonally will affect both arcs more or less, according to the particular direction of the movement.

If we suppose the arc *f* to be connected by proper intermediaries with the tiller-engine, and the other, *g*, with the link-motion of the driving or propelling engine, it will be seen that both engines can be affected simultaneously in any requisite sense, or that either can be operated without reference to or affecting in any way the action of the other.

I have not deemed it necessary to show the engines or their connections. The tiller-engine may be such an one, for instance, as described and shown in my Letters Patent No. 203,224, dated April 30, 1878; and the driving-engine with whose link-motion I propose to connect my apparatus may be of any approved construction. The connection is made in each case through the medium of a crank-arm and wrist-pin, *h*, with which each arc is provided.

In lieu of having arcs composed of two parallel straps, each arc may be made of but one strap. In that case the lower end of the lever should have two longitudinal axial slits or slots at right angles to one another, so that the straps at their point of intersection or crossing may enter said slots. I prefer, however, the arrangement shown in the drawings. I remark also that in some cases but one arc is needed in combination with the universal-joint lever. That arc can be used to actuate the principal mechanism, while the lever acts more or less directly upon some other mechanism directly or indirectly connected with the first.

I do not, therefore, limit myself to the details herein shown and described in illustration of my improvements; but

What I claim as my invention in means for controlling the driving and steering apparatus of vessels, traction or road engines, and the like, and, in general, any two engines which it is desired to hold under control and work together simultaneously, independently, or even in opposition, is—

1. The combination, substantially as set forth, of a universal-joint lever and one or more hinged arcs or frames, moved by said lever, said parts being adapted to connect with the controlling mechanisms of engines to be controlled, substantially as set forth.

2. The combination of hinged arcs, placed at right angles with one another, and the universal-joint lever, engaging said arcs at their point of crossing, substantially as set forth.

3. The universal-joint lever, in combination with the hinged arcs, engaging said lever at their point of crossing, and provided each with a crank-arm, substantially as and for the purpose set forth.

4. The hinged arcs, composed of two parallel straps, in combination with the universal-joint lever, entering the square formed by the crossing of said straps, and cylindrical in shape, substantially as set forth.

5. In combination with the universal-joint lever and the parts connected with and operated thereby, the locking-nut, movable on said lever, substantially as and for the purpose set forth.

In testimony whereof I have hereunto signed my name in the presence of two subscribing witnesses.

HERBERT WADSWORTH.

Witnesses:
GEO. H. LYMAN, Jr.,
FERD. B. WALKER.